(No Model.)
C. J. LIPPOLD.
SUPPORT FOR WEIGHING SCALES.
No. 567,106. Patented Sept. 1, 1896.
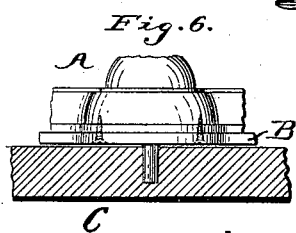
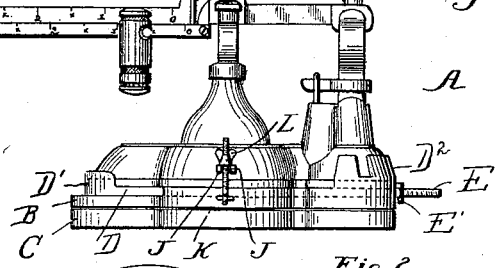
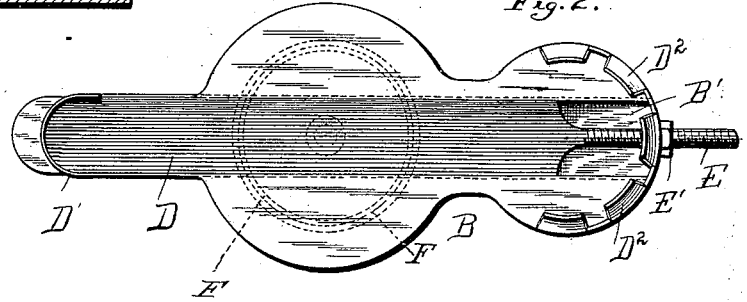
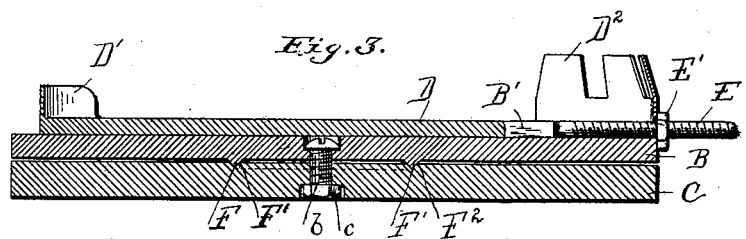
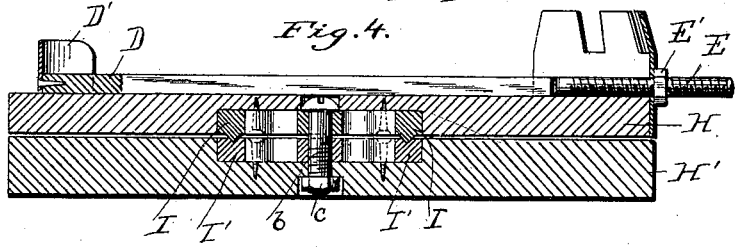
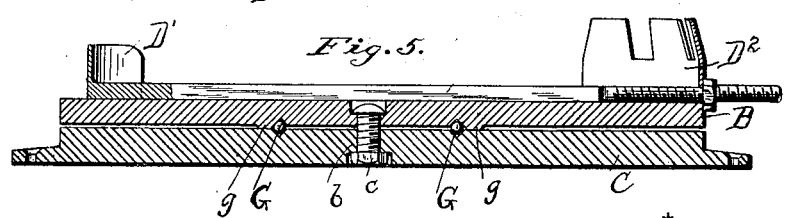
Witnesses,
Inventor.
Charles J. Lippold.
By Charles J. Stockman, Atty.

UNITED STATES PATENT OFFICE.

CHARLES J. LIPPOLD, OF WASHINGTON, DISTRICT OF COLUMBIA.

SUPPORT FOR WEIGHING-SCALES.

SPECIFICATION forming part of Letters Patent No. 567,106, dated September 1, 1896.

Application filed November 2, 1893. Serial No. 489,857. (No model.)

*To all whom it may concern:*

Be it known that I, CHARLES J. LIPPOLD, a citizen of the United States, residing at Washington, in the District of Columbia, have invented certain new and useful Improvements in Supports for Weighing-Scales; and I do hereby declare the following to be a full, clear, and exact description of the invention, such as will enable others skilled in the art to which it appertains to make and use the same.

In counter or other beam scales it is necessary for the user to be in front of the scale in order properly and conveniently to adjust it to weigh a given quantity of material. As the material to be weighed frequently is on the side of the scale remote from the beam thereof and on the side adjacent to the user, it is often necessary for the latter either to lift the scale up by hand and then turn it bodily around so as to bring its beam into position where he can see the figures and adjust the weight (which frequently is inconvenient and, if the scale is a heavy one, impossible to perform) or else go to the beam, adjust the weight, and return to weigh the material sought, either of which requirements results in loss of time. To overcome this disadvantage by a simple and practical device, which, incidentally, may be attached to any of the scales now in use, and thereby to save the time and labor of the user, is the object of my invention.

To this end the invention consists in so constructing and mounting the scale that it may be easily and quickly swung around, as if mounted on a pivot, to bring its respective sides to any desired place relative to the user.

In the accompanying drawings, illustrating my invention, Figure 1 is a side elevation of a scale constructed in accordance with my invention. Fig. 2 is a plan view of, and Fig. 3 is a longitudinal section through, one means for supporting the scale. Figs. 4 and 5 are longitudinal sections of modified forms of the supporting device, and Fig. 6 is a detail view of another modification.

The same letters of reference are used to designate the same parts in the several figures.

A designates the scale proper, which may be of any construction, and B designates the upper plate, and C the lower plate, of my improved support for the scale. Upon the upper plate B the scale A rests, and said plate will therefore be made of a shape corresponding with or approximating to the base of the scale. The lower plate C is designed to rest upon the counter, (to which it may be secured,) and it supports the upper plate and the scale, said upper plate resting directly upon said lower plate, as shown. The two plates are secured together by a bolt and nut $b$ and $c$, which bolt may be made of sufficient length to extend through the counter, and thereby serve to secure the device thereto, although it is not so shown in the drawings.

The scale is removably secured to the upper plate B by any suitable clamping device, but I prefer to employ a securing means such as is shown in the drawings, embodying flanges or lugs $D'$ and $D^2$, which engage the ends of the scale-base, and one of which, as $D'$, is movable to and from said scale-base. Said movable flange or lug is shown as carried by a slide D, which is fitted in a longitudinal groove or recess $B'$ in the upper plate and has projecting from its end that is remote from said flange a threaded rod E, engaged by a nut $E'$. The side walls of the groove or recess $B'$ and the side edges of the slide are suitably beveled to prevent vertical displacement of the slide. By turning the nut $E'$ in one or the other direction the slide may be moved forward or back, thereby making it adjustable to suit scales of different lengths, the importance of which will readily be seen. The upper plate is thus secured to the scale, and it is pivotally or otherwise suitably mounted on the lower plate, so as to be capable of turning thereon in a horizontal plane in order to permit the position of the scale to be quickly and easily changed to the one most convenient to the user. To accomplish this purpose, I have shown in Figs. 1, 2, and 3 constructions in which the under side of the upper plate is formed with a ring F, which projects beyond the surface of said upper plate and is received by an annular groove $F'$ in the upper face of the lower plate C, having abrupt vertical walls, within which groove the ring projects in such manner as to engage said walls thereof, said ring and groove, together with the bolt $b$, serving to guide the upper plate in its movement. Other means for accomplishing this purpose may be employed. For example, as shown in Fig. 5, balls G, rotating in recesses in the plates and preferably protected from dust by a side plate g, may be used with good effect, or casters suitably journaled may be employed in lieu of balls, if preferred.

In Figs. 1, 2, and 3 the plates B and C are shown as castings with the ring F and groove F', respectively, formed on and in them; but, as shown in Fig. 4, the parts H and H', corresponding with the parts B and C, may be made of wood instead of metal, in which event rings I and I' will be provided, said rings being made of metal and let into openings suitably formed in the plates to receive them, and one of them, as I, being formed to project beyond the surface of the plate and the other, I', formed with a groove to receive said projecting part.

If desired, the scale may be formed or provided with lugs J, between which the free end of a pivoted threaded rod K may be located, the threaded end of said rod being engaged by a thumb-nut L, which rests upon the upper sides of the lugs J, and serves, when screwed down, as an additional means for locking the scale to the upper plate.

The scale may be released when it is desired to remove it by turning the nut E' in a proper direction, which forces the slide in a direction that will increase the distance between its lug D' and the lugs D². I do not deem it necessary to employ the swinging rod K and thumb-nut L, but if they are used it obviously will be necessary to release them before adjusting the slide to release the scale. This is accomplished by loosening the thumb-nut and turning the rod down upon its pivot.

Other modifications than those above mentioned may suggest themselves to those skilled in the art to which this invention appertains, and I therefore do not wish to be understood as limiting myself to the particular construction herein shown and described, but reserve to myself the liberty of varying the details without departing from the spirit of my invention. For example, the upper plate may be secured or bolted to the scale or formed integral with the base thereof, and formed or provided with a downwardly-extending post having a suitable step-bearing, which will allow it to be swung horizontally; but I prefer any of the constructions above described, as they will more effectually accomplish the end sought.

I do not wish to be understood as claiming, broadly, any form of clamping devices secured to a rotatable plate, as this is not broadly new with me; but, while I do not limit myself to the use of the particular form of clamping mechanism herein shown and described, I do disclaim the intention of covering any form of clamp but one which is operative to secure a weighing-scale to a rotatable plate in such manner that said scale is quickly removable from the plate.

Having thus described my invention, what I believe to be new and desire to secure by Letters Patent, and what I therefore claim, is—

1. The combination of a stationary plate, a rotative plate mounted thereon, a scale mounted on said rotative plate, clamping-lugs for securing the scale to the rotative plate, one of said lugs being movable, and means movable longitudinally on said rotative plate to advance and retract said movable clamping-lug into and out of engagement with the scale-base.

2. The combination with a scale, of a plate having a lug at one end engaging one end of the base of the scale, a horizontally-movable lug, engaging the other end of the scale-base, and a base-plate to which said first-mentioned plate is pivoted, substantially as described and for the purposes specified.

3. The combination with a scale, of a plate, having a lug at one end, engaging one end of the base of said scale, and also having a downwardly-projecting annular flange, a horizontally-movable lug, engaging the other end of the scale-base, a base-plate, having an annular recess for receiving the annular flange of said first-mentioned plate, and a threaded bolt and nut for securing said plates together, substantially as described and for the purposes set forth.

4. The combination with a scale, having lugs, of a plate, having lugs engaging the ends of the base of the scale, the lug at one end being movable to and from the scale-base, a threaded rod, pivoted to said plate and having a nut on its threaded end, and a base-plate, on which said first-mentioned plate is pivotally mounted, substantially as described and for the purposes specified.

5. A scale provided with a support therefor; said support consisting of a plate, having a longitudinal groove formed with beveled side walls and also having, at one end, a lug engaging an end of the base of the scale; a slide having beveled edges, operating in said groove in the plate and formed with a threaded rod extending outward from one of its ends and with a lug at its other end; a nut on said threaded rod; and a base-plate, on which said first-mentioned plate is pivotally mounted, substantially as shown and described.

6. The herein-described weighing-scale, consisting of the weighing part proper, the base, a rotative plate having lugs engaging opposite ends of said base, one of said lugs being movable longitudinally to and from said base, and means for advancing and retracting said movable lug.

7. A scale-support, consisting of a stationary base-plate, formed with an annular groove having abrupt vertical walls; a rotative plate, resting directly on said base-plate and having a depending ring projecting into said groove and engaged at its opposite sides by the walls thereof; and clamping devices for a scale-base, carried by said rotative plate, substantially as described.

8. The combination with the stationary base, having an annular groove and an opening within the part bounded by said groove; a rotative plate having flanges resting upon said base and also having an annular flange received by said groove and an opening alined with that in the base; a threaded post extending through said openings; a nut on the lower end of said post; and clamping devices carried by the rotative plate.

In testimony whereof I affix my signature in presence of two witnesses.

CHARLES J. LIPPOLD.

Witnesses:
    CHAS. J. STOCKMAN,
    O. H. BUDLONG.